(12) United States Patent
Abe

(10) Patent No.: US 11,336,320 B2
(45) Date of Patent: May 17, 2022

(54) RF MODULE

(71) Applicant: FUJIKURA LTD., Tokyo (JP)

(72) Inventor: Shinya Abe, Sakura (JP)

(73) Assignee: FUJIKURA LTD., Tokyo (JP)

( * ) Notice: Subject to any disclaimer, the term of this patent is extended or adjusted under 35 U.S.C. 154(b) by 241 days.

(21) Appl. No.: 16/876,603

(22) Filed: May 18, 2020

(65) Prior Publication Data

US 2020/0373958 A1 Nov. 26, 2020

(30) Foreign Application Priority Data

May 24, 2019 (JP) .............................. JP2019-097777

(51) Int. Cl.
*H04B 1/40* (2015.01)
*H04B 17/20* (2015.01)
*H04B 17/10* (2015.01)

(52) U.S. Cl.
CPC ............. *H04B 1/40* (2013.01); *H04B 17/104* (2015.01); *H04B 17/20* (2015.01)

(58) Field of Classification Search
CPC .......... H04B 1/40; H04B 17/12; H04B 17/20; H04B 17/29; H04B 17/104

See application file for complete search history.

(56) References Cited

U.S. PATENT DOCUMENTS

| 2019/0206133 | A1* | 7/2019 | Xiao ...................... G06T 19/006 |
| 2019/0207657 | A1* | 7/2019 | Cao ......................... H04B 7/063 |
| 2020/0322812 | A1* | 10/2020 | Shi ......................... H04W 16/28 |
| 2021/0368358 | A1* | 11/2021 | Sheng ..................... G01S 11/02 |

FOREIGN PATENT DOCUMENTS

JP 2004-15800 A 1/2004

* cited by examiner

*Primary Examiner* — Thanh C Le

(74) *Attorney, Agent, or Firm* — WHDA, LLP

(57) ABSTRACT

An object is to provide an RF module arranged such that a user can understand the state of the RF module even when the user handles the RF module in a place at a distance from a BB module and that the user can understand the state of the RF module even if, for example, the BB module has some trouble. The RF module is connectable to the BB module which is disposed external to the RF module. The RF module includes a module controller configured to output data indicative of the state of the RF module exteriorly of the RF module without use of the BB module.

8 Claims, 5 Drawing Sheets

RF MODULE

This Nonprovisional application claims priority under 35 U.S.C. § 119 on Patent Application No. 2019-097777 filed in Japan on May 24, 2019, the entire contents of which are hereby incorporated by reference.

TECHNICAL FIELD

The present invention relates to an RF module. In particular, the present invention relates to an RF module that is connectable to a BB module external to the RF module.

BACKGROUND ART

A radio apparatus is usually comprised of a BB module for baseband signal processing, an RF module for radio frequency signal processing, and an antenna. Patent Literature 1 discloses a smart antenna system configured as such. The antenna included in this smart antenna system is a phased array antenna.

CITATION LIST

Patent Literature

[Patent Literature 1]
Japanese Patent Application Publication, Tokukai, No. 2004-15800

SUMMARY OF INVENTION

Technical Problem

In a radio apparatus that operates in a high-frequency band such as millimeter-wave band or microwave band, it is difficult to place the antenna outside the RF module and connect the antenna and the RF module by a coaxial cable. To address this, an arrangement in which the RF module is equipped with the antenna (the antenna is implemented inside the RF module) is often applied. In a case where such an arrangement is applied, it is preferable that the BB module and the RF module are implemented separately from each other and are capable of being located at different places from each other. This is because the RF module equipped with the antenna should be located in a place suitable for the electromagnetic waves transmitter and receiver whereas the BB module should be located in a place where the BB module is insusceptible to noise. The approach of such an arrangement, however, entails the following issue.

Specifically, the operation of placing the RF module is carried out preferably under the condition in which a user is aware of the state of the RF module. For example, the operation of placing an RF module equipped with a highly directional antenna, such as a phased array antenna, is carried out preferably under the condition in which a user is aware of the exact tilt angle and azimuth angle of the RF module. One example way to achieve this would be to equip the RF module with an angle sensor. According to conventional arrangements, however, the tilt angle and azimuth angle of the RF module detected by the angle sensor of the RF module are transmitted from the RF module to the BB module and outputted from the BB module or from a device connected to the BB module. It is therefore difficult for a user, who carries out the operation of placing the RF module in a place distant from the BB module, to understand the tilt angle and the azimuth angle of the RF module. Furthermore, the conventional arrangements also have the following issue: because the state of the RF module is outputted through the BB module, if the BB module has some trouble (such as mechanical failure or bug in software), the user cannot understand the correct state of the RF module.

An aspect of the present invention was made in view of the above issue, and an object thereof is to provide an RF module arranged such that a user can understand the state of the RF module even when the user handles the RF module in a place at a distance from the BB module and that the user can understand the state of the RF module even if, for example, the BB module has some trouble.

Solution to Problem

An RF module in accordance with Aspect 1 of the present invention is an RF module configured to process a radio frequency signal. The RF module is connectable to a BB module that processes a baseband signal and that is disposed external to the RF module. The RF module includes a controller configured to output data indicative of a state of the RF module exteriorly of the RF module without use of the BB module.

Advantageous Effects of Invention

According to an aspect of the present invention, it is possible to provide an RF module arranged such that a user can understand the state of the RF module even when the user handles the RF module in a place at a distance from a BB module and that the user can understand the state of the RF module even if, for example, the BB module has some trouble.

DESCRIPTION OF EMBODIMENTS (Configuration of RF Module)

Figure 1:
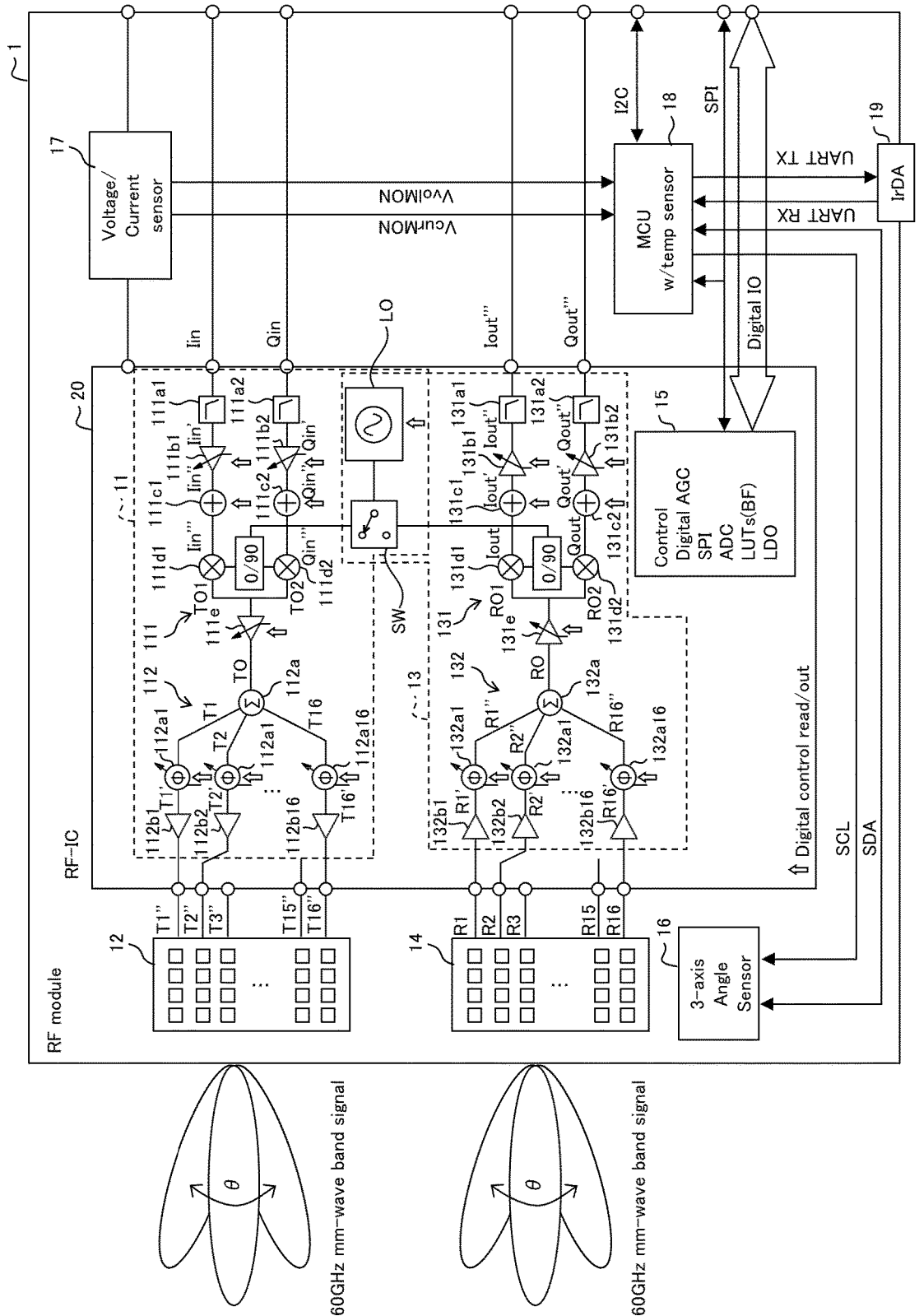
FIG. 1 is a block diagram illustrating an RF module in accordance with an embodiment of the present invention.

The following description will discuss a configuration of an RF module 1 in accordance with an embodiment of the present invention with reference to FIG. 1. FIG. 1 is a block diagram illustrating the RF module 1.

The RF (radio frequency) module 1 is a module to process mainly radio frequency signals (in the present embodiment, millimeter-wave band signals belonging to 60 GHz band). As illustrated in FIG. 1, the RF module 1 includes a transmitter circuit 11, a transmitter antenna 12, a receiver circuit 13, a receiver antenna 14, an integrated circuit (IC) controller 15, an angle sensor 16, a current/voltage sensor 17, a module controller 18 (an example of "controller" recited in the claims), and a communication interface 19. The transmitter circuit 11, the receiver circuit 13, and the IC controller 15 are implemented on a radio frequency integrated circuit (RFIC) 20. The RF module 1 is capable of having connected thereto a base band (BB) module (not illustrated) that is disposed external to the RF module 1 and that processes mainly baseband signals.

The transmitter circuit 11 is a circuit to convert transmission signals Tin and Qin, which are baseband signals inputted from the BB module, into transmission signals T1" to T16" which are radio frequency signals. The transmission signals T1" to T16" obtained at the transmitter circuit 11 are outputted to the transmitter antenna 12. Note here that the transmission signal Tin is a transmission signal of a channel I and the transmission signal Qin is a transmission signal of a channel Q. The transmitter circuit 11 can be constituted by, for example, as illustrated in FIG. 1, an up-converter 111 and a divider circuit 112.

The up-converter 111 converts the transmission signals Tin and Qin, which are baseband signals inputted from the BB module, into a transmission signal T0 which is a radio frequency signal. The up-converter 111 can be constituted by, for example, as illustrated in FIG. 1, low-pass filters 111$a$1 and 111$a$2, variable-gain amplifiers 111$b$1 and 111$b$2, adders 111$c$1 and 111$c$2, multipliers (mixers) 111$d$1 and 111$d$2, a variable-gain amplifier 111$e$, a local oscillator LO, and a switch SW. The local oscillator LO and the switch SW are shared between the up-converter 111 and a down-converter 131 (described later).

The low-pass filters 111$a$1 and 111$a$2 remove high frequency elements from the transmission signals Tin and Qin, respectively, to thereby obtain transmission signals Tin' and Qin' which have the high frequency elements removed therefrom. The variable-gain amplifiers 111$b$1 and 111$b$2 amplify the transmission signals Tin' and Qin' to thereby obtain amplified transmission signals Iin" and Qin", respectively. The adders 111$c$1 and 111$c$2 add DC voltage to the amplified transmission signals Tin" and Qin", respectively, to thereby add offsets and obtain transmission signals Tin'" and Qin'" having the DC components added thereto. The multipliers 111$d$1 and 111$d$2 multiply the transmission signals Tin'" and Qin'" by local signals, respectively, to thereby generate transmission signals T01 and T02 which are radio frequency signals. These local signals are inputted from the local oscillator LO through the switch SW when a transmitter is operated. Note that the local signal outputted to the multiplier 111$d$1 and the local signal outputted to the multiplier 111$d$2 are out of phase by 90 degrees. The variable-gain amplifier 111$e$ combines and amplifies the transmission signals T01 and T02 obtained at the multipliers 111$d$1 and 111$d$2 to thereby obtain a transmission signal T0. The transmission signal T0 generated at the variable-gain amplifier 111$e$ is outputted to the divider circuit 112.

The divider circuit 112 divides the transmission signal T0, which is a radio frequency signal inputted from the up-converter 111, into transmission signals T1" to T16" which are radio frequency signals. The divider circuit 112 can be constituted by, for example, as illustrated in FIG. 1, a demultiplexer 112$a$, phase shifters 112$a$1 to 112$a$16, and power amplifiers 112$b$1 to 112$b$16.

The demultiplexer 112$a$ demultiplexes the transmission signal T0 into transmission signals T1 to T16. The phase shifters 112$a$1 to 112$a$16 delay the phases of the transmission signals T1 to T16 demultiplexed at the demultiplexer 112$a$, respectively, to thereby obtain phase-delayed transmission signals T1' to T16'. The power amplifiers 112$b$1 to 112$b$16 amplify the phase-delayed transmission signals T1' to T16', respectively, to thereby obtain amplified transmission signals T1" to T16". Each of the amplified transmission signals T1" to T16" is outputted to the transmitter antenna 12.

The transmitter antenna 12 is an element to convert the transmission signals T1" to T16", which are inputted from the transmitter circuit 11, into electromagnetic waves. The electromagnetic waves obtained at the transmitter antenna 12 are transmitted exteriorly. The transmitter antenna 12 in the present embodiment is a phased array antenna. Note that the direction in which the phased array antenna shows the maximum gain is determined by the amounts by which the phases are shifted by the phase shifters 112$a$1 to 112$a$16.

The receiver antenna 14 is an element to convert exteriorly received electromagnetic waves into received signals R1 to R16. The received signals R1 to R16 obtained at the receiver antenna 14 are outputted to the receiver circuit 13. The receiver antenna 14 in the present embodiment is a phased array antenna. Note that the direction in which the phased array antenna shows the maximum gain is determined by the amounts by which the phases of the received signals R1 are R16 are delayed by phase shifters 132$a$1 to 132$a$16 (described later).

The receiver circuit 13 is a circuit to convert the received signals R1 to R16, which are radio frequency signals inputted from the receiver antenna 14, into received signals Iout'" and Qout'" which are baseband signals. The received signals Iout'" and Qout'" obtained at the receiver circuit 13 are outputted to the BB module. Note here that the received signal Iout'" is a received signal of a channel I, whereas the received signal Qout'" is a received signal of a channel Q. The receiver circuit 13 can be constituted by, for example, as illustrated in FIG. 1, the down-converter 131 and a combiner circuit 132.

The combiner circuit 132 combines the received signals R1 to R16, which are radio frequency signals inputted from the receiver antenna 14, to thereby obtain a received signal R0 which is a radio frequency signal. The combining circuit 132 can be constituted by, for example, as illustrated in FIG. 1, a multiplexer 132$a$, the phase shifters 132$a$1 to 132$a$16, and low-noise amplifiers 132$b$1 to 132$b$16.

The low-noise amplifiers 132$b$1 to 132$b$16 amplify the received signals R1 to R16, respectively, to thereby obtain amplified received signals R1' to R16'. The phase shifters 132$a$1 to 132$a$16 delay the phases of the amplified received signals R1' to R16', respectively, to thereby obtain phase-delayed received signals R1" to R16". The multiplexer 132$a$ multiplexes the phase-delayed received signals R1" to R16" to thereby obtain a received signal R0. The received signal R0 obtained at the multiplexer 132$a$ is outputted to the down-converter 131.

The down-converter 131 converts the received signal R0, which is a radio frequency signal inputted from the combining circuit 132, into received signals Iout'" and Qout'" which are baseband signals. The down-converter 131 can be constituted by, for example, as illustrated in FIG. 1, low-pass filters 131$a$1 and 131$a$2, variable-gain amplifiers 131$b$1 and 131$b$2, adders 131$c$1 and 131$c$2, multipliers (mixers) 131$d$1 and 131$d$2, a variable-gain amplifier 131$e$, the local oscillator L0, and the switch SW. The local oscillator L0 and the switch SW are shared between the down-converter 131 and the foregoing up-converter 111.

The variable-gain amplifier 131$e$ amplifies and divides the received signal R0 to thereby obtain amplified and divided received signals R01 and R02. The multipliers 131d1 and 131d2 multiply the amplified and divided received signals R01 and R02 by local signals, respectively, to thereby generate received signals Iout and Qout, which are baseband signals. These local signals are inputted from the local oscillator LO through the switch SW when a receiving operation is carried out. Note that the local signal outputted to the multiplier 131d1 and the local signal outputted to the multiplier 131d2 are out of phase by 90 degrees. The adders 131c1 and 131c2 add DC components to the received signals Iout and Qout generated at the multipliers 131d1 and 131d2, respectively, to thereby remove offsets and obtain received signals Iout' and Qout' having the DC components added thereto. The variable-gain amplifiers 131b1 and 131b2 amplify the received signals Iout' and Qout', respectively, to thereby obtain amplified received signals Iout" and Qout". The low-pass filters 131a1 and 131a2 remove high frequency elements from the amplified received signals Iout" and Qout" to thereby obtain received signals Iout''' and Qout''' having the high frequency elements removed therefrom. Each of the received signals Iout''' and Qout''' is outputted to the BB module.

The IC controller 15 sets, to values designated by the BB module, parameters that determine the operation of the transmitter circuit 11 and parameters that determine the operation of the receiver circuit 13. Among the parameters set by the IC controller 15 to designated values, the parameters that determine the operation of the transmitter circuit 11 are, for example, oscillation frequency of the local oscillator LO, gains of the variable-gain amplifiers 111b1, 111b2, and 111e, the amounts of DC components added by the adders 111c1 and 111c2, the amounts by which the phases are shifted by the phase shifters 112a1 to 112a16, and/or the like. Among the parameters set by the IC controller 15 to designated values, the parameters that determine the operation of the receiver circuit 13 are, for example, oscillation frequency of the local oscillator LO, gains of the variable-gain amplifiers 131b1, 131b2, and 131e, the amounts of DC components added by the adders 131c1 and 131c2, the amounts by which the phases are shifted by the phase shifters 132a1 to 132a16, and/or the like.

In the present embodiment, the IC controller 15 is connected to the BB module through a serial peripheral interface (SPI). The SPI is constituted by four signal lines: SCLK, MISO, MOSI, and CS (SS) (these are represented by a single-line arrow in FIG. 1). The SCLK is a signal line for transmission of serial clock from the BB module to the RF module 1. The MISO is a signal line for transmission of data from the RF module 1 to the BB module. The MOSI is a signal line for transmission of data from the BB module to the RF module 1. The CS is a signal line for transmission of information indicative of an interval in which data transmitted from the BB module to the RF module 1 is set. The values of the foregoing parameters are transmitted from the BB module to the IC controller 15 through the MOSI.

The angle sensor 16 is a sensor to detect at least one of the tilt angle and azimuth angle of the RF module 1. In the present embodiment, the angle sensor 16 is a 3-axis electronic compass IC, and detects both the tilt angle and azimuth angle of the RF module 1. A signal (digital signal) outputted from the angle sensor 16, indicative of the tilt angle and azimuth angle of the RF module 1, is outputted to the module controller 18 through signal lines SCL and SDA by I2C communication.

The current/voltage sensor 17 is a sensor to detect at least one of electric current and voltage inputted from an external device such as the BB module to the RF module 1. In other words, the current/voltage sensor 17 is a sensor to detect at least one of the current consumption and power supply voltage of the RF module 1. In the present embodiment, the current/voltage sensor 17 is a current-and-voltage sensor IC, and detects both the current consumption and power supply voltage of the RF module 1. A signal (analog signal) outputted from the current/voltage sensor 17, indicative of the current consumption and power supply voltage of the RF module 1, is outputted to the module controller 18.

The module controller 18 acquires data indicative of the state of the RF module 1, and outputs the acquired data exteriorly of the RF module 1. The data acquired by the module controller 18 can contain designated values of parameters that determine the operation of the transmitter circuit 11. The data acquired by the module controller 18 can also contain designated values of parameters that determine the operation of the receiver circuit 13. The data acquired by the module controller 18 can also contain a detection value obtained at the angle sensor 16. The data acquired by the module controller 18 can also contain a detection value obtained at the current/voltage sensor 17. In the present embodiment, the module controller 18 is a micro-controller unit (MCU) that contains a temperature sensor therein. The data acquired by the module controller 18 can also contain a detection value obtained at the temperature sensor.

The module controller 18 is connectable to a controller of the BB module (not illustrated) through an I2C interface. In order to be able to comply with radio laws in different countries, the module controller 18 stores set values for gains and phase shift amounts for the divider circuit 112 and the combining circuit 132. The BB module acquires these set values through the I2C interface as digital signals (SCL, SDA).

Note that the signal outputted from the current/voltage sensor 17, which is an analog signal, is converted into a digital signal by an analog-to-digital converter (ADC) contained in the module controller 18. In so doing, if the value of the signal outputted from the current/voltage sensor 17 is greater than a reference voltage set by the module controller 18, the value of the resulting digital signal sticks to the upper limit (for example, 0xFFF in a case of 12 bit). To avoid such an instance, the current/voltage sensor 17 and the module controller 18 may have a voltage divider resistance, a variable-gain amplifier, and/or the like interposed between them.

The module controller 18 transmits the acquired data, indicative of the state of the RF module 1, to an external device through the communication interface 19. In the present embodiment, the communication interface 19 for transmission of the data indicative of the state of the RF module 1 to the external device is an infrared communication interface complying with the IrDA standards (TTC Standard, JF-IR001.10). Furthermore, a communication protocol used to transmit the data indicative of the state of RF module 1 to the external device is universal asynchronous receiver transmitter (UART). How the module controller 18 operates will be described later with reference to another drawing.

The external device causes, for example, a display (which is contained therein) to display the data indicative of the state of the RF module 1 received from the RF module 1. With this, a user of the external device can easily understand the state of the RF module 1. The transmission of the data from the RF module 1 to the external device here is carried out without use of the BB module. Therefore, even if the BB module has some trouble (such as mechanical failure or bug in software), such a trouble does not hinder the user from understanding the state of the RF module 1.

Specifically, the transmitter antenna 12 and the receiver antenna 14 used in the RF module 1 are highly directional phased array antennas. Therefore, when the operation of placing the RF module 1 is carried out, the tilt angle and azimuth angle of the RF module 1 should be adjusted accurately. In carrying out such an operation, it is important that the operator is aware of the exact tilt angle and azimuth angle of the RF module 1. To accomplish this, the function of the RF module 1, which is capable of allowing the operator to easily understand the tilt angle and azimuth angle of the RF module 1 through an external device (preferably a portable device), is effective.

Note that a reason why the transmitter circuit 11 includes the divider circuit 112 is that the transmitter antenna 12 is of a type that receives a plurality of transmission signals T1 to T16 (in the present embodiment, a phased array antenna). In a case where the transmitter antenna 12 is of a type that receives a single transmission signal T0, the divider circuit 112 of the transmitter circuit 11 is omittable. Similarly, a reason why the receiver circuit 13 includes the combining circuit 132 is that the receiver antenna 14 is of a type that outputs a plurality of received signals R1 to R16 (in the present embodiment, a phased array antenna). In a case where the receiver antenna 14 is of a type that outputs a single received signal R0, the combining circuit 132 of the receiver circuit 13 is omittable.

(Example of How Module Controller Operates)

Figure 2:
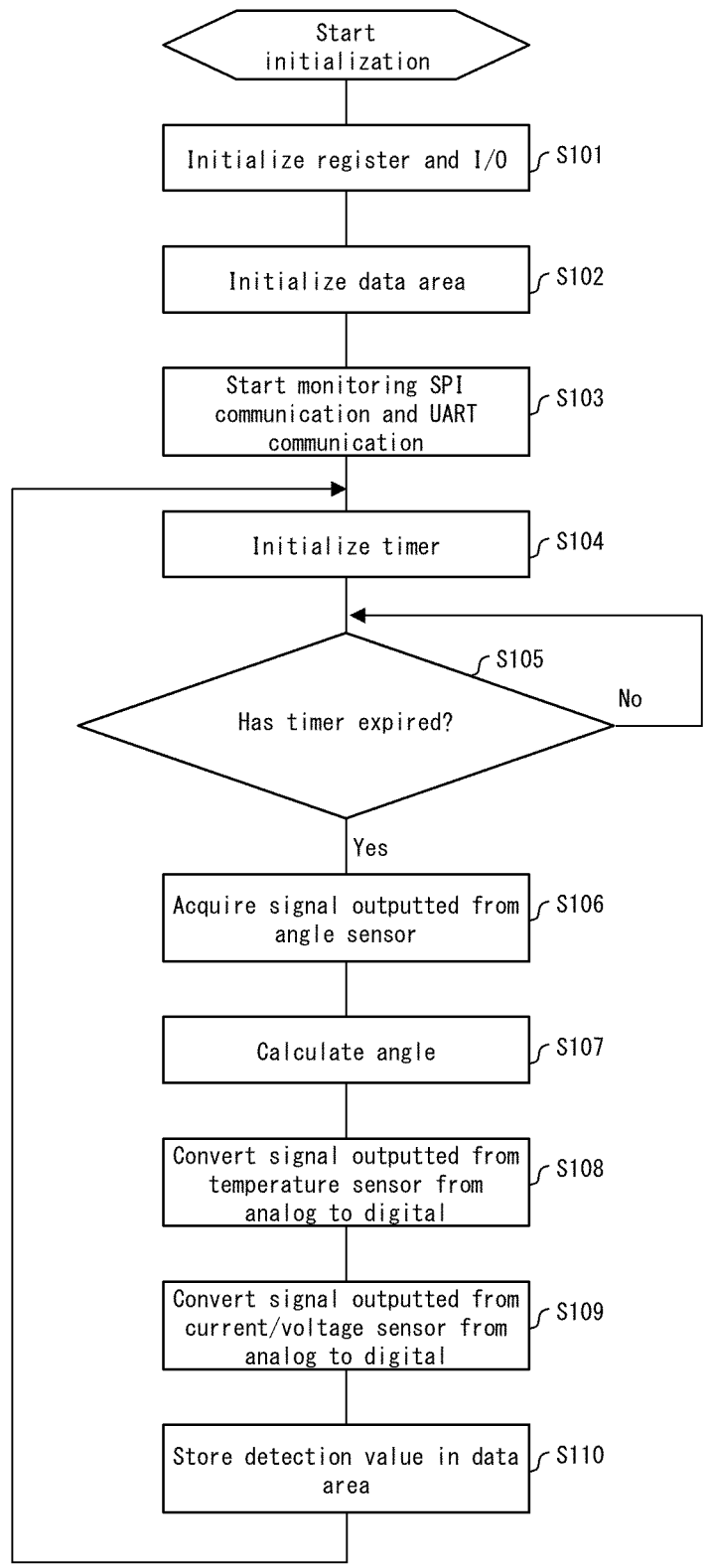
FIG. 2 is a flowchart showing an example of a flow (main flow) of how a module controller included in the RF module of FIG. 1 operates.
Figure 3:
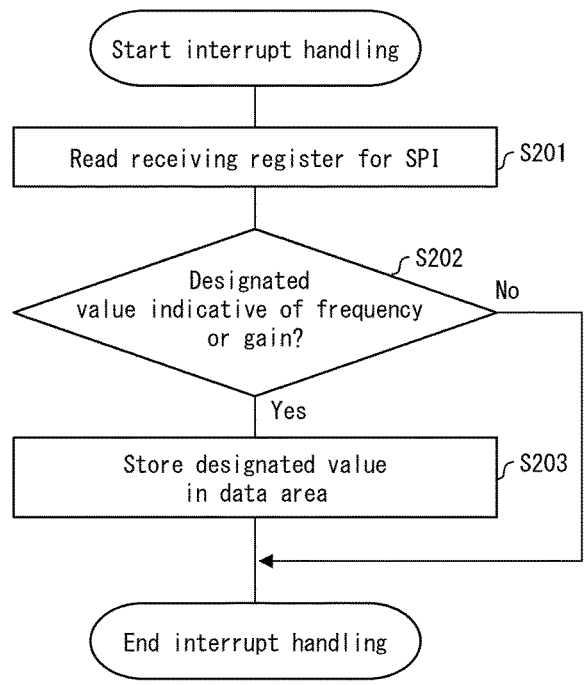
FIG. 3 is a flowchart showing an example of a flow of interrupt handling carried out by the module controller included in the RF module of FIG. 1 when SPI communication interrupt occurs.
Figure 4:
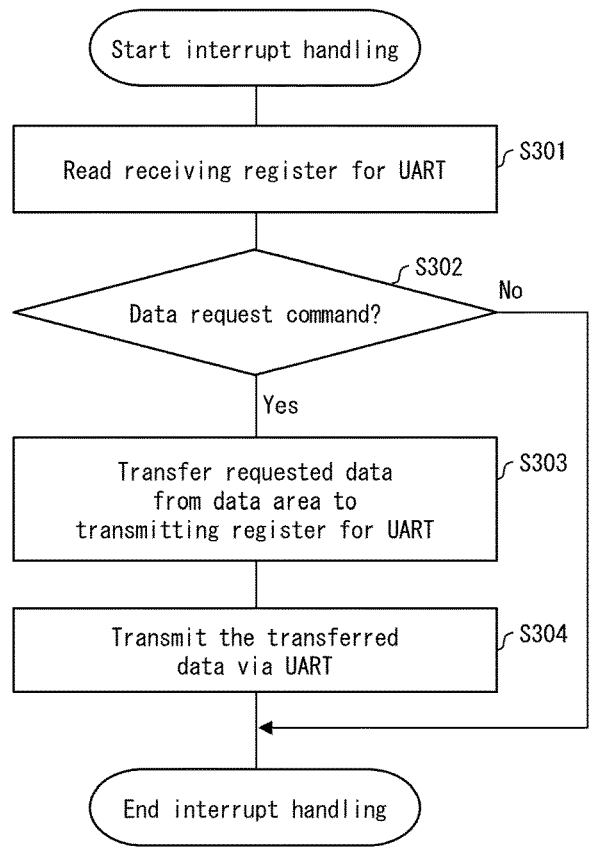
FIG. 4 is a flowchart showing an example of a flow of interrupt handling carried out by the module controller included in the RF module of FIG. 1 when UART communication interrupt occurs.

The following description will discuss how the module controller 18 operates, with reference to FIGS. 2 to 4.

FIG. 2 is a flowchart showing an example of a flow (main flow) of how the module controller 18 operates.

First, the module controller 18 initializes an internal register and I/O (S101). Next, the module controller 18 initializes a data area of the register contained in the module controller 18 (S102). Next, the module controller 18 starts monitoring SPI communication and UART communication (S103). Next, the module controller 18 initializes a timer (S104). A period T0 (e.g., 100 ms) is set in the timer to acquire detection values obtained at the angle sensor 16 and the current/voltage sensor 17. When time T elapsed from the initialization of the timer reaches the end of the period T0 (Yes in S105), the module controller 18 carries out the following steps.

First, the module controller 18 reads a signal (digital signal) outputted from the angle sensor 16 and thereby determines detection values (e.g., magnitudes of magnetic fields in X, Y, and Z axis directions) obtained at the angle sensor 16 (S106). Next, the module controller 18 calculates the tilt angle and azimuth angle of the RF module 1 from the thus-determined detection values obtained at the angle sensor (S107).

Next, the module controller 18 converts a signal (analog signal) outputted from the temperature sensor contained in the module controller 18 from analog to digital, and thereby determines the temperature of the RF module 1 (S108). Next, the module controller 18 coverts a signal (analog signal) outputted from the current/voltage sensor 17 from analog to digital, and thereby determines the current consumption and power supply voltage of the RF module 1 (S109).

Next, the module controller 18 stores, in the data area of the register contained in the module controller 18, the tilt angle and azimuth angle of the RF module 1 calculated in step S107, the temperature of the RF module 1 determined in step S108, and the current consumption and power supply voltage of the RF module 1 determined in step S109 (S110). The module controller 18, upon completion of step S110, carries out step S104 and subsequent steps again.

As has been described, the module controller 18 periodically acquires detection values indicative of the state (specifically, detection values indicative of the tilt angle and azimuth angle of the RF module 1, the temperature of the RF module 1, the current consumption and power supply voltage of the RF module 1) of the RF module 1 from the angle sensor 16, the temperature sensor contained in the module controller 18, and the current/voltage sensor 17. The detection values thus acquired are then stored in the data area of the register contained in the module controller 18.

FIG. 3 is a flowchart showing a flow of interrupt handling carried out by the module controller 18 upon detection of occurrence of SPI communication (more specifically, upon detection of an event of writing, to a receiving register for SPI communication included in the IC controller 15, a designated value by the BB module).

First, the module controller 18 reads the data written by the BB module to the receiving register for SPI communication included in the IC controller 15 (S201). In a case where the data read in step S201 is a designated value indicative of a frequency and/or a gain of the transmitter circuit 11 and/or the receiver circuit 13 (Yes in S202), the module controller 18 stores the designated value read in step S201 in the data area of the register contained in the module controller 18 (S203). On the contrary, in a case where the data read in step S201 is not a designated value indicative of a frequency and/or a gain of the transmitter circuit 11 and/or the receiver circuit 13 (No in S202), the module controller 18 ends the interrupt handling without carrying out step S203.

As has been described, upon designation of a frequency and/or a gain of the transmitter circuit 11 and/or the receiver circuit 13 by the BB module through SPI communication, the module controller 18 acquires the designated value from the receiving register for SPI communication included in the IC controller 15. The designated value thus acquired is then stored in the data area of the register contained in the module controller 18.

FIG. 4 is a flowchart showing a flow of interrupt handling carried out by the module controller 18 upon detection of occurrence of UART communication (more specifically, upon detection of an event of writing, by a command, by an external device, to a receiving register for UART communication included in the module controller 18).

First, the module controller 18 reads the command written to the receiving register for UART communication by the external device which is connected to the module controller 18 through the communication interface 19 (S301). In a case where the command read in step S301 is a data request command (Yes in S302), the controller 18 transfers data requested in the data request command from the data area of the register contained in the module controller 18 to a transmitting register for UART communication (S303). Then, the controller 18 transmits the data transferred to the transmitting register for UART communication to the external device which is connected to the module controller 18 through the communication interface 19 (S304). As used herein, the term "data request command" refers to a command that requests the foregoing detection value indicative of a state of the RF module 1 or designated value. On the contrary, in a case where the command read in step S301 is not a data request command (No in S302), the module controller 18 ends the interrupt handling without carrying out steps S303 and S304.

As has been described, upon receipt of a data request command through UART communication from an external device which is connected to the module controller 18 through the communication interface 19, the module controller 18 transmits data requested in the data request command to the external device.

(Housing of RF Module)

Figure 5:
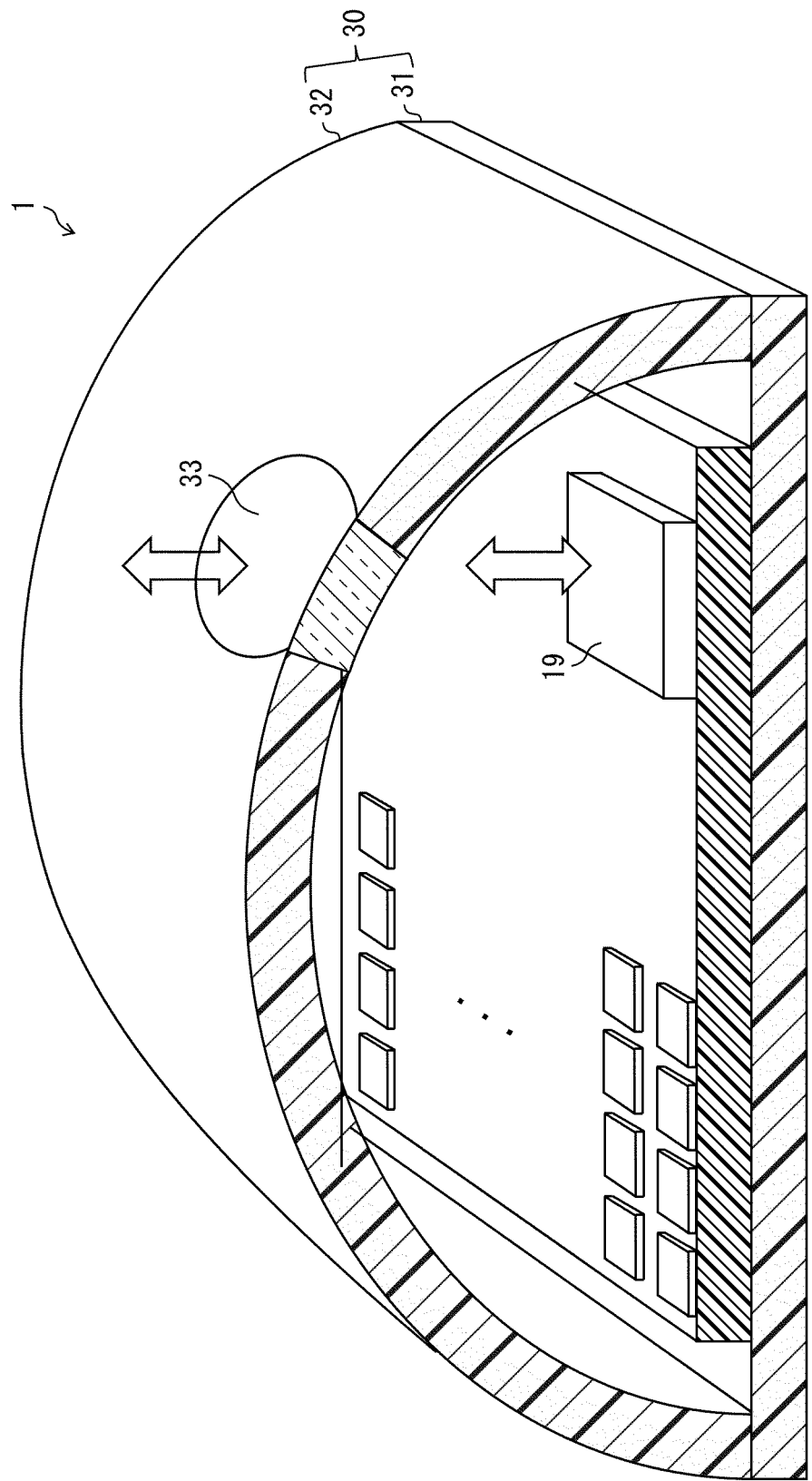
FIG. 5 is a partial cross-sectional view of a housing of the RF module of FIG. 1.

The following description will discuss a housing 30 of the RF module 1 with reference to FIG. 5. FIG. 5 is a partial cross-sectional view of the RF module 1.

The RF module 1 can have the housing 30 which is constituted by a base 31 and a radome 32. In this case, the foregoing transmitter circuit 11, transmitter antenna 12, receiver circuit 13, receiver antenna 14, IC controller 15, angle sensor 16, current/voltage sensor 17, module controller 18, and communication interface 19 are accommodated in the inner space defined by the housing 30.

The radome 32 is a structure to protect those structures accommodated in the inner space defined by the housing 30 against sunlight and weathering, and is composed of a material that allows passage of electromagnetic waves outputted from the transmitter antenna 12 and electromagnetic waves inputted to the receiver antenna 14. In a case where the protection against sunlight is considered more important, it is preferable that the radome 32 blocks light shorter in wavelength than near infrared light (wavelength: 1000 nm). This would, however, also block infrared signals (e.g., wavelength: 850 nm or longer and 900 nm or less) outputted from the communication interface 19 (which is an infrared communication interface in the present embodiment). To address this, the radome 32 has a window portion 33 in an area where the infrared signal outputted from the communication interface 19 or inputted to the communication interface 19 passes through (e.g., a circular area having a diameter of 10 mm or greater and 20 mm or less). The window portion 33 is made of a weather-resistant transparent material (e.g., polycarbonate), and allows passage of infrared signals outputted from or inputted to the communication interface 19.

(Variation of RF Module)

The present embodiment employs an arrangement in which data indicative of the state of the RF module 1 is transmitted wirelessly from the RF module 1 to an external device through infrared light. However, the medium through which the data indicative of the state of the RF module 1 is transmitted from the RF module 1 to an external device is not limited to that described in the present embodiment.

For example, the following arrangement may be employed: data indicative of the state of the RF module 1 is transmitted wirelessly from the RF module 1 to an external device through an electromagnetic wave (including light) other than infrared light. In a case where this arrangement is employed, the communication interface 19 can be, for example, a Wi-Fi (registered trademark) communication interface, a Bluetooth (registered trademark) communication interface, or the like.

Alternatively, the following arrangement may be employed: data indicative of the state of the RF module 1, as an electrical signal or optical signal, is transmitted through wire from the RF module 1 to an external device. In a case where this arrangement is employed, the communication interface 19 can be, for example, an RJ-45 modular jack, an SC optical connector, or the like. The transmission protocol can be, for example, I2C, RS-485, RS-422, or the like.

The present embodiment employs an arrangement in which the RF module 1 includes the communication interface 19 and outputs data indicative of the state of the RF module 1 through communications using the communication interface 19 (specifically, transmits the data indicative of the state of the RF module 1 to an external device). However, the manner in which the data indicative of the state of the RF module 1 is outputted by the RF module 1 may be any manner, and is not limited to the manner described in the present embodiment.

For example, the following arrangement may be employed: the RF module 1 includes an indicator and outputs the data indicative of the state of the RF module 1 through use of the indicator (specifically, presents the state of the RF module 1 to a user visually). The following table shows examples of outputs of indicators (in the following examples, the indicators are green LED and red LED). Note that, in a case where such an arrangement is employed, it is preferable that the radome 32 has a window portion that allows passage of visible light emitted by the indicators so that the manner in which the indicators illuminate is visible to the user.

TABLE 1

| Parameter indicative of state of RF module | Condition | Green LED | Red LED |
|---|---|---|---|
| Angle | Within set range (designated value ± 5°) | Flash at 1 second intervals | Illuminate in a manner that differs depending on voltage, current. temperature |
| Angle | Outside set range (designated value ± 5°) | Flash at 0.5 second intervals | |
| Voltage, current, temperature | Outside set range | OFF | Always ON |
| Voltage, current, temperature | Within set range | Always ON | OFF |
| Data written through SPI | Read error due to garbling of data etc. | OFF | Flash at 1 second intervals |

Alternatively, the following arrangement may be employed: the RF module 1 includes a display and outputs the data indicative of the state of the RF module 1 with use of the display (specifically, presents the data indicative of the state of the RF module 1 to a user visually, in other words, displays the data indicative of the state of the RF module 1). One example of such an arrangement is that the data indicative of the state of the RF module 1 is displayed on the display in a numerical form.

The present embodiment employs an arrangement in which the IC controller 15 is connected to an SPI communication interface by four signal lines SCLK, MISO, MOSI, and CS (SS) without use of the module controller 18. In this arrangement, therefore, the module controller 18 acquires values (values of parameters that determine the operation of the transmitter circuit 11 or the receiver circuit 13) designated by the BB module by reading the receiving register for SPI communication included in the IC controller 15. Note, however, that the present invention is not limited to such an arrangement.

Figure 6:
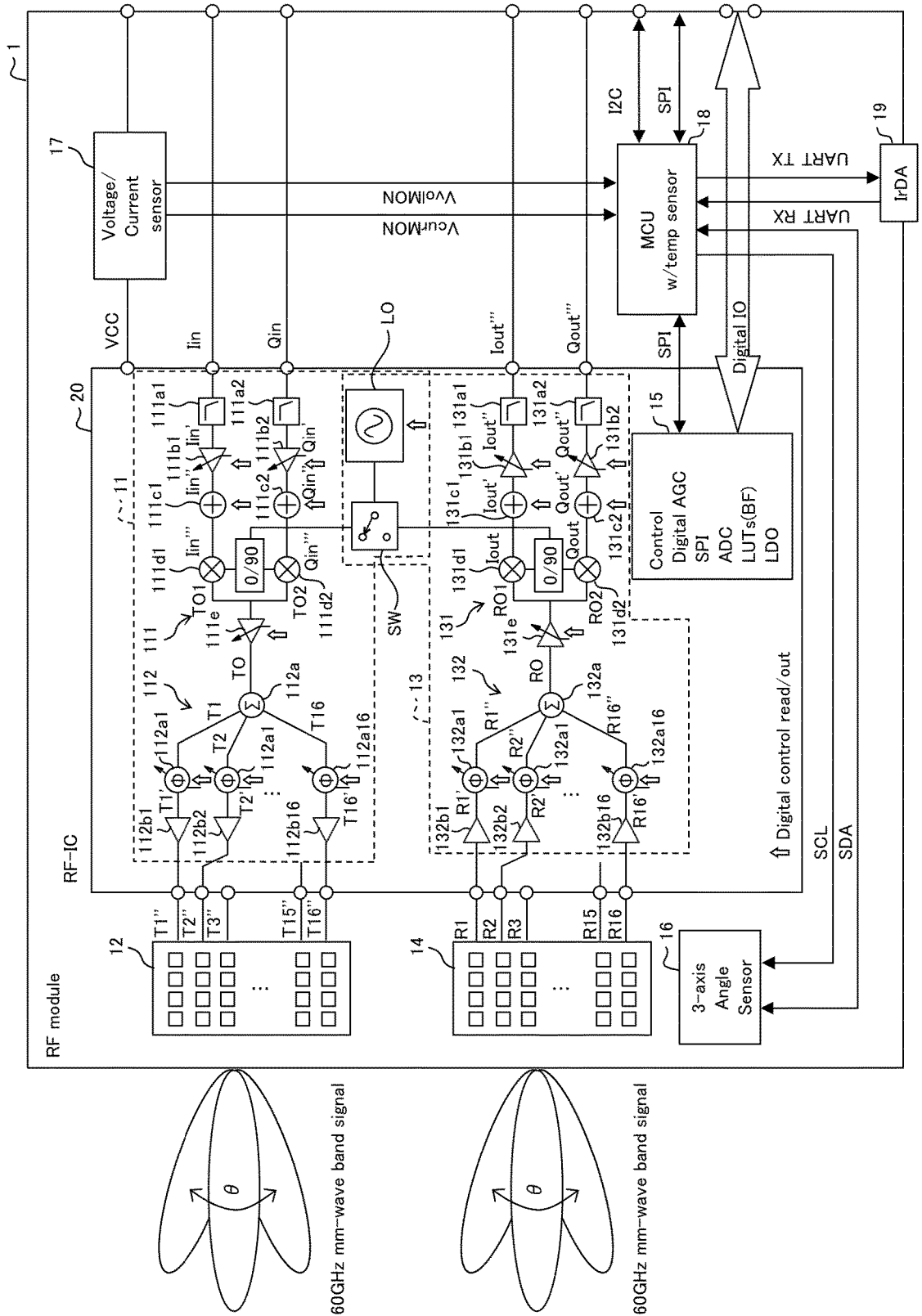
FIG. 6 is a block diagram illustrating a variation of the RF module of FIG. 1.

For example, the following arrangement may be employed, as illustrated in FIG. 6: the IC controller 15 is connected to the SPI communication interface through the module controller 18 by four signal lines SCLK, MISO, MOSI, and CS (SS) (these are represented by a single-line arrow in FIG. 6). In a case where this arrangement is employed, data transmitted from the BB module is stored in the data area of the register contained in the module controller 18 and then transferred to the IC controller 15. On the contrary, data transmitted from the IC controller 15 is stored in the data area of the register contained in the module controller 18 and then transferred to the BB module. In this arrangement, when the module controller 18 reads a value designated by the BB module and data thereof is garbled (data which should correctly read 0 can be read as 1), the module controller 18 does not transfer the data to the IC controller 15 and requests the BB module to resend data. This makes it possible to improve the accuracy of data transfer.

(Note)

The present invention is not limited to the foregoing embodiments, but can be altered by a skilled person in the art within the scope of the claims. The present invention also encompasses, in its technical scope, any embodiment derived by combining technical means disclosed in differing embodiments.

Aspects of the present invention can also be expressed as follows.

An RF module in accordance with Aspect 1 of the present invention is an RF module configured to process a radio frequency signal, in which the RF module is connectable to a BB module that processes a baseband signal and that is disposed external to the RF module, and the RF module includes a controller configured to output data indicative of a state of the RF module exteriorly of the RF module without use of the BB module.

According to the above arrangement, it is possible to output the data indicative of the state of the RF module without use of the BB module. This allows a user to understand the state of the RF module even when the user handles the RF module in a place at a distance from the BB module. Furthermore, even if the BB module has some trouble (such as mechanical failure or bug in software), such a trouble does not hinder the user from understanding the state of the RF module.

An RF module in accordance with Aspect 2 of the present invention employs the following arrangement in addition to the arrangement of the RF module in accordance with Aspect 1. Specifically, the RF module in accordance with Aspect 2 further includes an antenna and an angle sensor, and is arranged such that the data contains data indicative of at least one of a tilt angle and an azimuth angle of the RF module detected by the angle sensor.

According to the above arrangement, a user can understand at least one of the tilt angle and azimuth angle of the RF module including the antenna, even when the user handles the RF module in a place at a distance from the BB module. Furthermore, even if the BB module has some trouble, such a trouble does not hinder the user from understanding at least one of the tilt angle and azimuth angle of the RF module including the antenna.

An RF module in accordance with Aspect 3 of the present invention employs the following arrangement in addition to the arrangement of the RF module in accordance with Aspect 1 or 2. Specifically, the RF module in accordance with Aspect 3 further includes a current/voltage sensor, and is arranged such that the data contains data indicative of at least one of current consumption and power supply voltage of the RF module detected by the current/voltage sensor.

According to the above arrangement, a user can understand at least one of the current consumption and power supply voltage of the RF module, even when the user handles the RF module in a place at a distance from the BB module. Furthermore, even if the BB module has some trouble, such a trouble does not hinder the user from understanding at least one of the current consumption and power supply voltage of the RF module.

An RF module in accordance with Aspect 4 of the present invention employs the following arrangement in addition to the arrangement of the RF module in accordance with any of Aspects 1 to 3. Specifically, The RF module in accordance with Aspect 4 further includes a temperature sensor, and is arranged such that the data contains data indicative of a temperature of the RF module detected by the temperature sensor.

According to the above arrangement, a user can understand the temperature of the RF module even when the user handles the RF module in a place at a distance from the BB module. Furthermore, even if the BB module has some trouble, such a trouble does not hinder the user from understanding the temperature of the RF module.

An RF module in accordance with Aspect 5 of the present invention employs the following arrangement in addition to the arrangement of the RF module in accordance with any of Aspects 1 to 4. Specifically, the RF module in accordance with Aspect 5 further includes a transmitter circuit and/or a receiver circuit, and is arranged such that the data contains data indicative of a frequency and/or a gain of the transmitter circuit and/or the receiver circuit.

According to the above arrangement, a user can understand the frequency and/or the gain of the transmitter circuit and/or the receiver circuit included in the RF module, even when the user handles the RF module in a place at a distance from the BB module. Furthermore, even if the BB module has some trouble, such a trouble does not hinder the user from understanding the frequency and/or the gain of the transmitter circuit and/or the receiver circuit included in the RF module.

An RF module in accordance with Aspect 6 of the present invention employs the following arrangement in addition to the arrangement of the RF module in accordance with any of Aspects 1 to 5. Specifically, the RF module in accordance with Aspect 6 further includes a communication interface, and is arranged such that the controller is configured to transmit the data to an external device through the communication interface.

According to the above arrangement, a user can understand, with use of the external device, the state of the RF module even when the user handles the RF module in a place at a distance from the BB module. Furthermore, the user can understand, with use of the external device, the state of the RF module even if, for example, the BB module has some trouble.

An RF module in accordance with Aspect 7 of the present invention employs the following arrangement in addition to the arrangement of the RF module in accordance with any of Aspects 1 to 6. Specifically, the RF module in accordance with Aspect 7 further includes an indicator, and is arranged such that the controller is configured to output the data exteriorly of the RF module and visually with use of the indicator.

According to the above arrangement, a user can understand, by visually checking the indicator, the state of the RF module even when the user handles the RF module in a place at a distance from the BB module. Furthermore, the user can understand, by visually checking the indicator, the state of the RF module even if, for example, the BB module has some trouble.

An RF module in accordance with Aspect 8 of the present invention employs the following arrangement in addition to the arrangement of the RF module in accordance with any of Aspects 1 to 7. Specifically, the RF module in accordance with Aspect 8 is arranged such that the radio frequency signal is a radio frequency signal that belongs to a millimeter-wave band.

According to the above arrangement, a user can understand the state of the RF module that processes radio frequency signals belonging to the millimeter-wave band, even when the user handles the RF module in a place at a distance from the BB module. Furthermore, the user can understand the state of the RF module that processes radio frequency signals belonging to the millimeter-wave band even if, for example, the BB module has some trouble.

REFERENCE SIGNS LIST

1 RF module
11 transmitter circuit
12 transmitter antenna
13 receiver circuit
14 receiver antenna
15 IC controller
16 angle sensor
17 current/voltage sensor
18 module controller (controller)
19 communication interface
20 RFIC
30 housing
31 base
32 radome
33 window portion

The invention claimed is:

1. An RF module configured to process a radio frequency signal, wherein:
    the RF module is connectable to a BB module that processes a baseband signal and that is disposed external to the RF module; and
    the RF module comprises a controller configured to output data indicative of a state of the RF module exteriorly of the RF module without use of the BB module.

2. The RF module as set forth in claim 1, further comprising an antenna and an angle sensor,
    wherein the data contains data indicative of at least one of a tilt angle and an azimuth angle of the RF module detected by the angle sensor.

3. The RF module as set forth in claim 1, further comprising a current/voltage sensor,
    wherein the data contains data indicative of at least one of current consumption and power supply voltage of the RF module detected by the current/voltage sensor.

4. The RF module as set forth in claim 1, further comprising a temperature sensor,
    wherein the data contains data indicative of a temperature of the RF module detected by the temperature sensor.

5. The RF module as set forth in claim 1, further comprising a transmitter circuit and/or a receiver circuit,
    wherein the data contains data indicative of a frequency and/or a gain of the transmitter circuit and/or the receiver circuit.

6. The RF module as set forth in claim 1, further comprising a communication interface,
    wherein the controller is configured to transmit the data to an external device through the communication interface.

7. The RF module as set forth in claim 1, further comprising an indicator,
    wherein the controller is configured to output the data exteriorly of the RF module and visually with use of the indicator.

8. The RF module as set forth in claim 1, wherein the radio frequency signal is a radio frequency signal that belongs to a millimeter-wave band.

* * * * *